S. ELLIOTT.
MACHINE FOR MAKING ADDRESS PLATES.
APPLICATION FILED OCT. 7, 1914.

1,232,666.

Patented July 10, 1917.
6 SHEETS—SHEET 1.

Witnesses:
H. B. Davis.
R. Connell.

Inventor:
Sterling Elliott
by Nays & Harriman
Attys

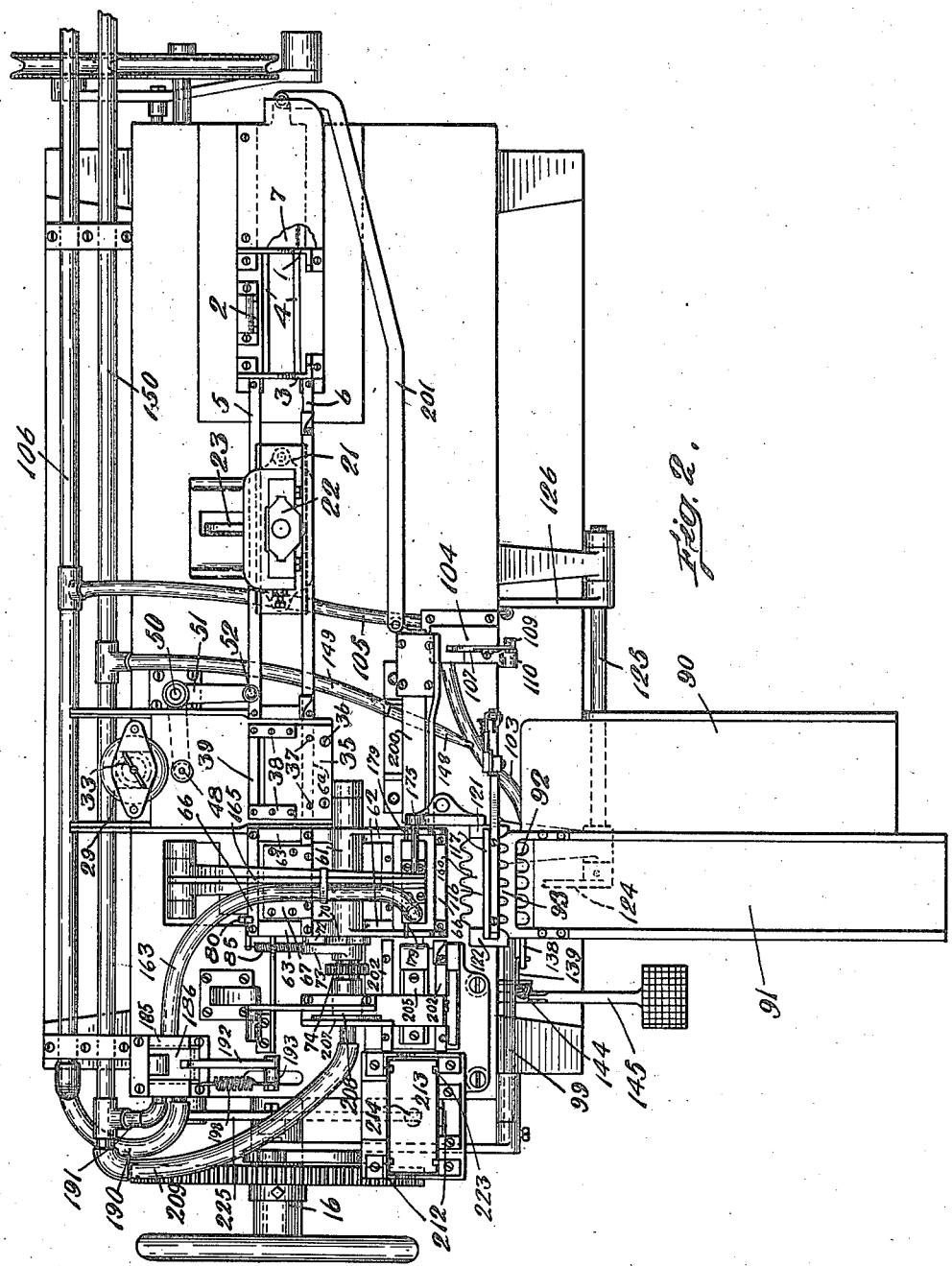

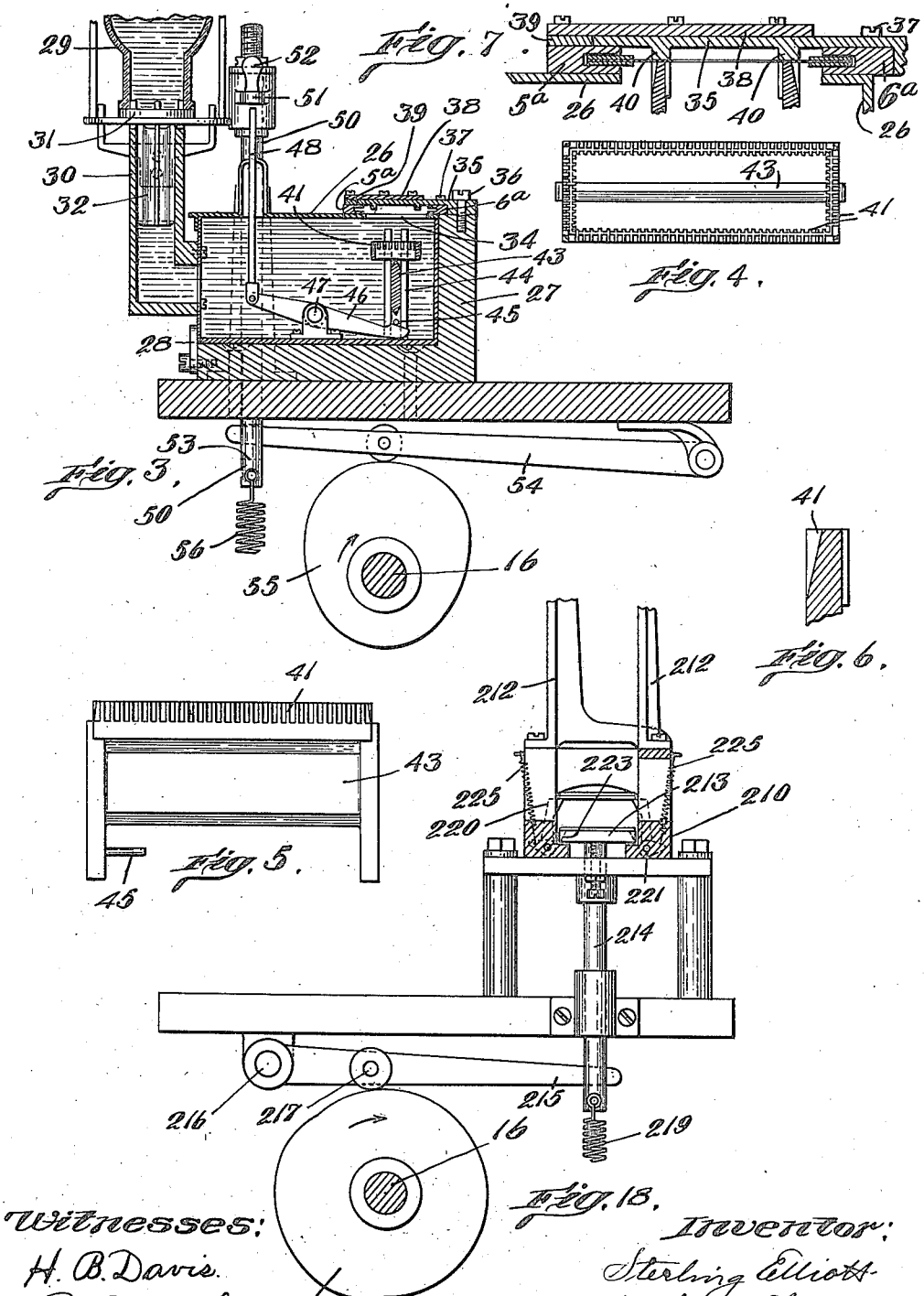

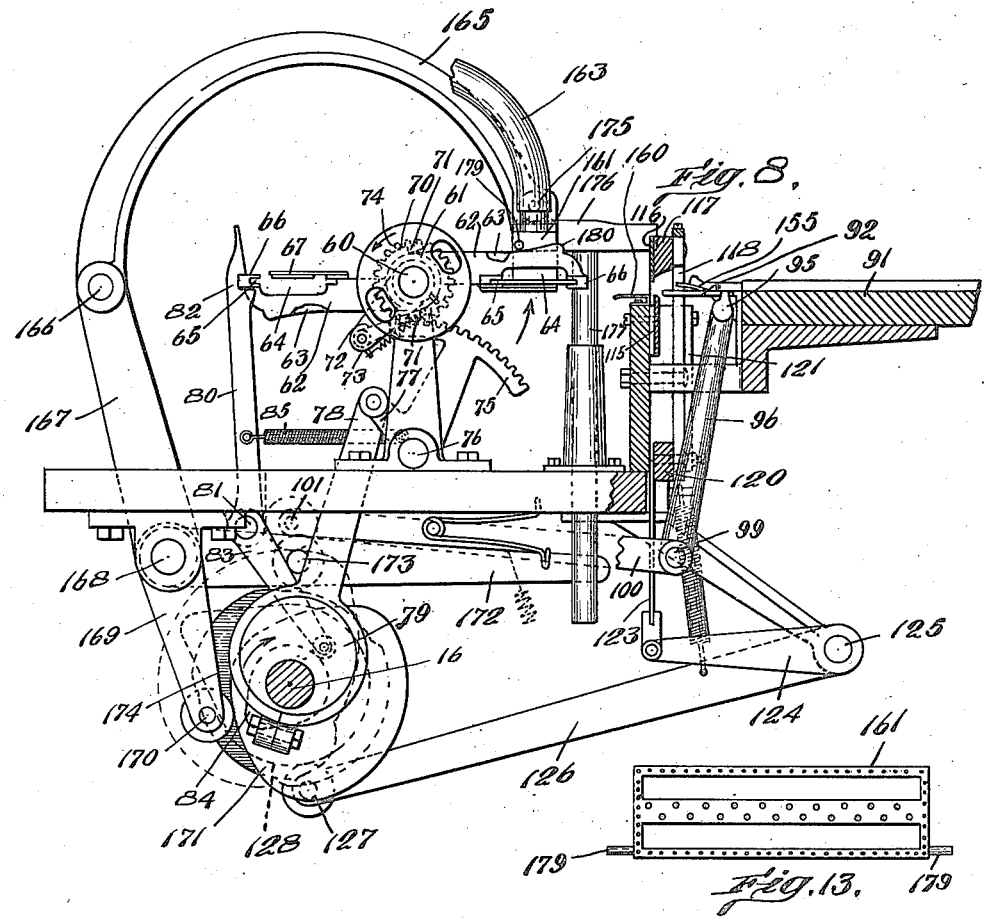
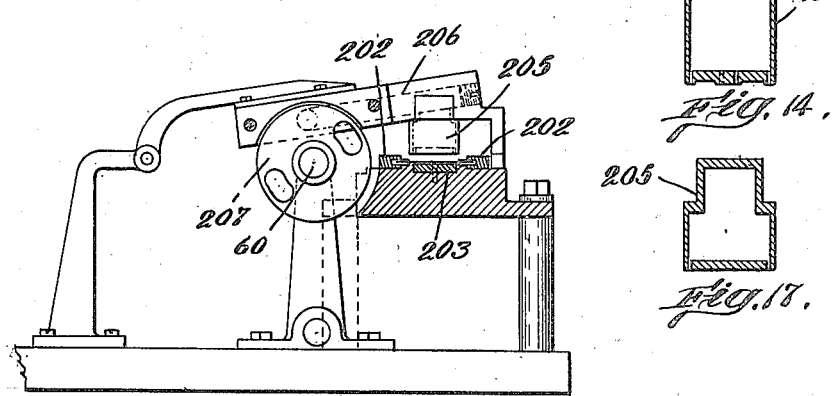

S. ELLIOTT.
MACHINE FOR MAKING ADDRESS PLATES.
APPLICATION FILED OCT. 7, 1914.
1,232,666.
Patented July 10, 1917.
6 SHEETS—SHEET 5.
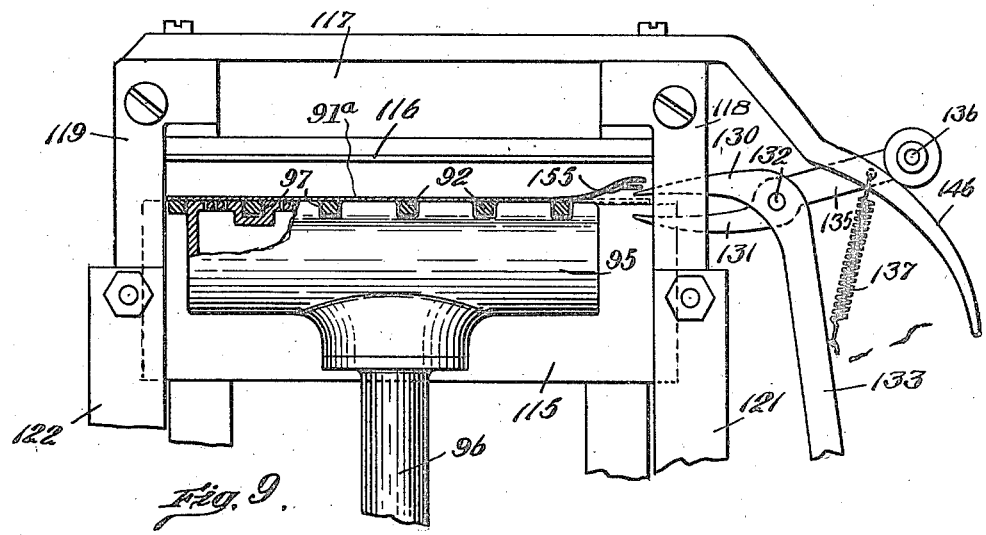
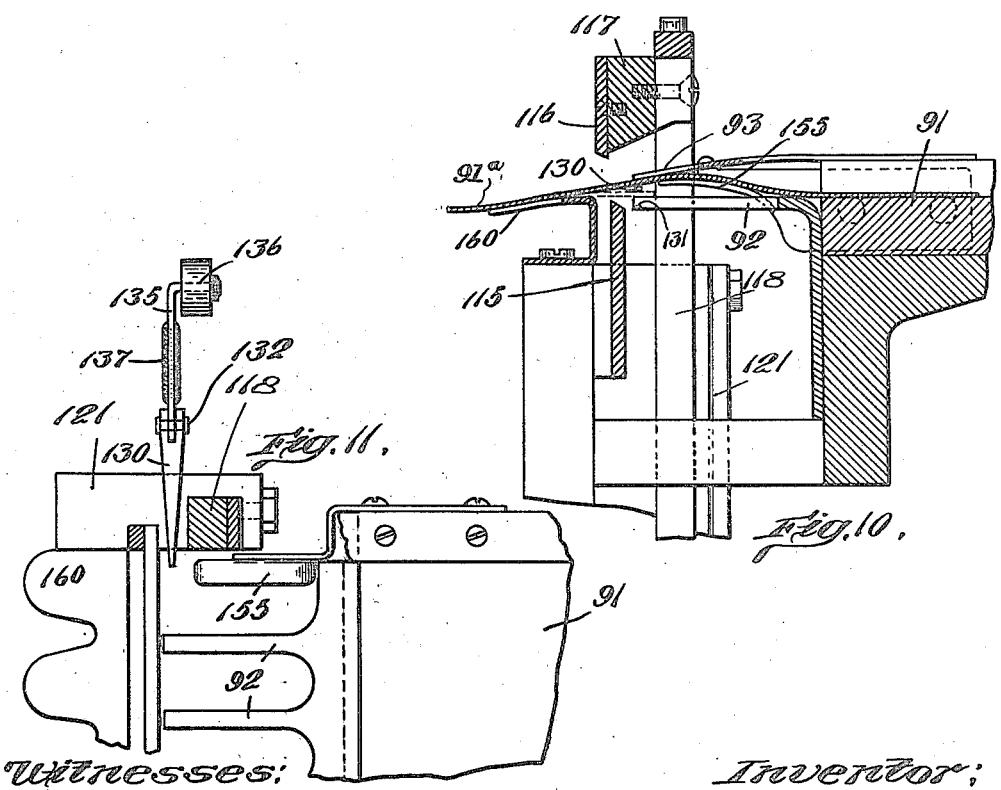

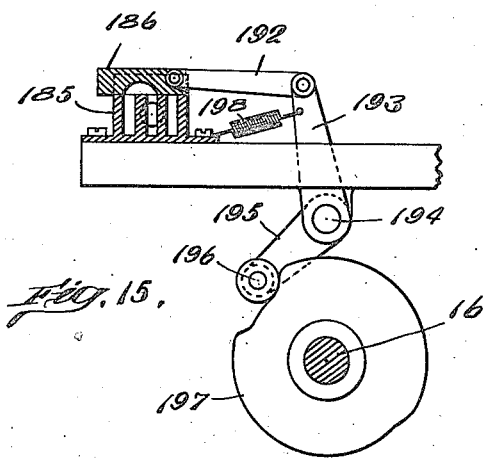
Fig. 15.
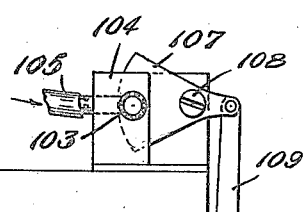
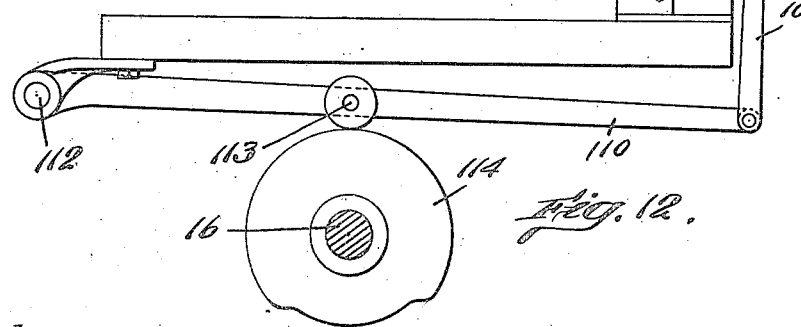
Fig. 12.
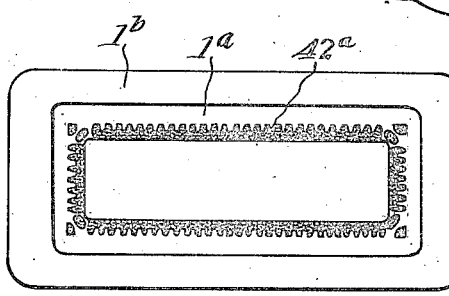
Fig. 19.
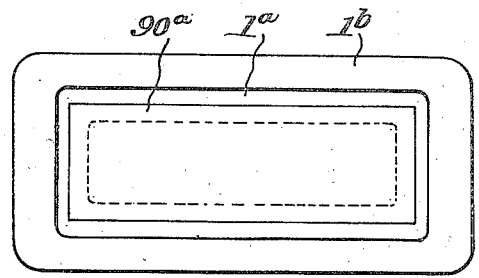
Fig. 20.

UNITED STATES PATENT OFFICE.

STERLING ELLIOTT, OF NEWTON, MASSACHUSETTS.

MACHINE FOR MAKING ADDRESS-PLATES.

1,232,666.  Specification of Letters Patent.  Patented July 10, 1917.

Application filed October 7, 1914. Serial No. 865,573.

*To all whom it may concern:*

Be it known that I, STERLING ELLIOTT, a citizen of the United States, residing at Newton, in the county of Middlesex and State of Massachusetts, have invented an Improvement in Machines for Making Address-Plates, of which the following is a specification.

This invention relates to machines for making address-plates, such for instance as represented in Letters Patent #1,068,578, dated July 29, 1913. These address-plates consist of a supporting-piece composed of paper or equivalent material, having an edge-frame to stiffen and reinforce it, said supporting-piece having an opening, and a stencil-blank composed of paper, such as mimeograph paper, secured to one side of said supporting-piece, which paper is extended over said opening. In the preferred form of address-plate the stencil-blank is made smaller than its supporting-piece and also smaller than the space within the edge-frame, and said stencil-blank is adhesively secured to its supporting-piece at the margin of the opening therein.

The present invention has for its object the production of an organized machine constructed and arranged to contain a pile of reinforced supporting-pieces and to feed said supporting-pieces successively to a suitable cutting-device by which openings are cut therein, or in lieu thereof the supporting-pieces may have been formed with openings previous to being arranged in the pile, and then to feed said supporting-pieces intermittingly to a pasting-device by which a line of paste is applied to one side of the supporting-pieces around the margins of the openings formed therein, then to feed said pasted supporting-pieces to a holding-device by which they are held while the stencil-blank is being applied thereto, said holding-device being reversible whereby the positions of the supporting-pieces are reversed, preferably, two holding-devices being employed, so that while one is in position to receive a pasted supporting-piece from the pasting-device, the other is in position to present a supporting-piece held by it to the stencil-blank applying-means; then to provide means for carrying the stencil-blanks to and affix them upon the pasted supporting-pieces, said means having associated with it means to deliver stencil-blanks into position to be engaged by the carrier, and feeding and cutting-means for a stencil-blank by which the stencil-blanks are formed and so delivered; then, preferably, to feed the supporting-pieces having stencil-blanks affixed to them, to a holder with which is associated means, whereby a blast of air is directed toward the edges of the stencil-blank, to lay down said edges in case they have a tendency to curl; then to feed the supporting-pieces, which at such time are finished and are ready to be used as address-plates, to a receptacle, with which means are associated whereby the address-plates are arranged in a pile or stack.

Another object of the invention is the construction of a pasting device especially adapted for use in connection with the present machine although it is also adapted for other uses, it involving a paste-box with means for automatically supplying it with paste, a pasting-form, and supporting and guiding-means for the supporting-pieces associated with the paste-box and arranged to hold the supporting-pieces over an opening in the paste-box, up through which the pasting-form is moved to deposit paste on the supporting-pieces, and means to move the pasting-form, which is timed with relation to the intermittent feeding-means, whereby the supporting-pieces are held at rest while the paste is being deposited thereon.

Another object is the provision and construction of rotatable reversing-holding-means for the supporting-pieces by which the supporting-pieces are reversed before presenting them to the stencil-blank applying-means, and, in this connection, the provision of a pair of holding-devices arranged for rotation, whereby one holding-device may occupy the position to receive a pasted-blank from the pasting-device, while the other holding-device is in position to present a pasted supporting-piece to the stencil-blank applying-means. Another object is the provision and construction of carrier for carrying stencil-blanks to and affixing them upon the pasted supporting-pieces. Another object is the provision and construction of means for feeding and cutting stencil-strips to form stencil-blanks, and arranging for the delivery of the severed sections, whereby they may be picked up or engaged by the carrier. Another object is the provision and construction of means for holding the supporting-pieces having the stencil-blanks applied to them with which is associated means for directing a blast of air toward the edges of the stencil-blanks, to lay down said edges in case they have a tendency to curl. Another object is the provision and construction of means arranged at the end of the machine for receiving the finished supporting-pieces and for arranging them in a pile or stack.

Fig. 2, is a plan view of the same.

Fig. 3, is an enlarged vertical sectional view of the pasting-means.

Figure 1:
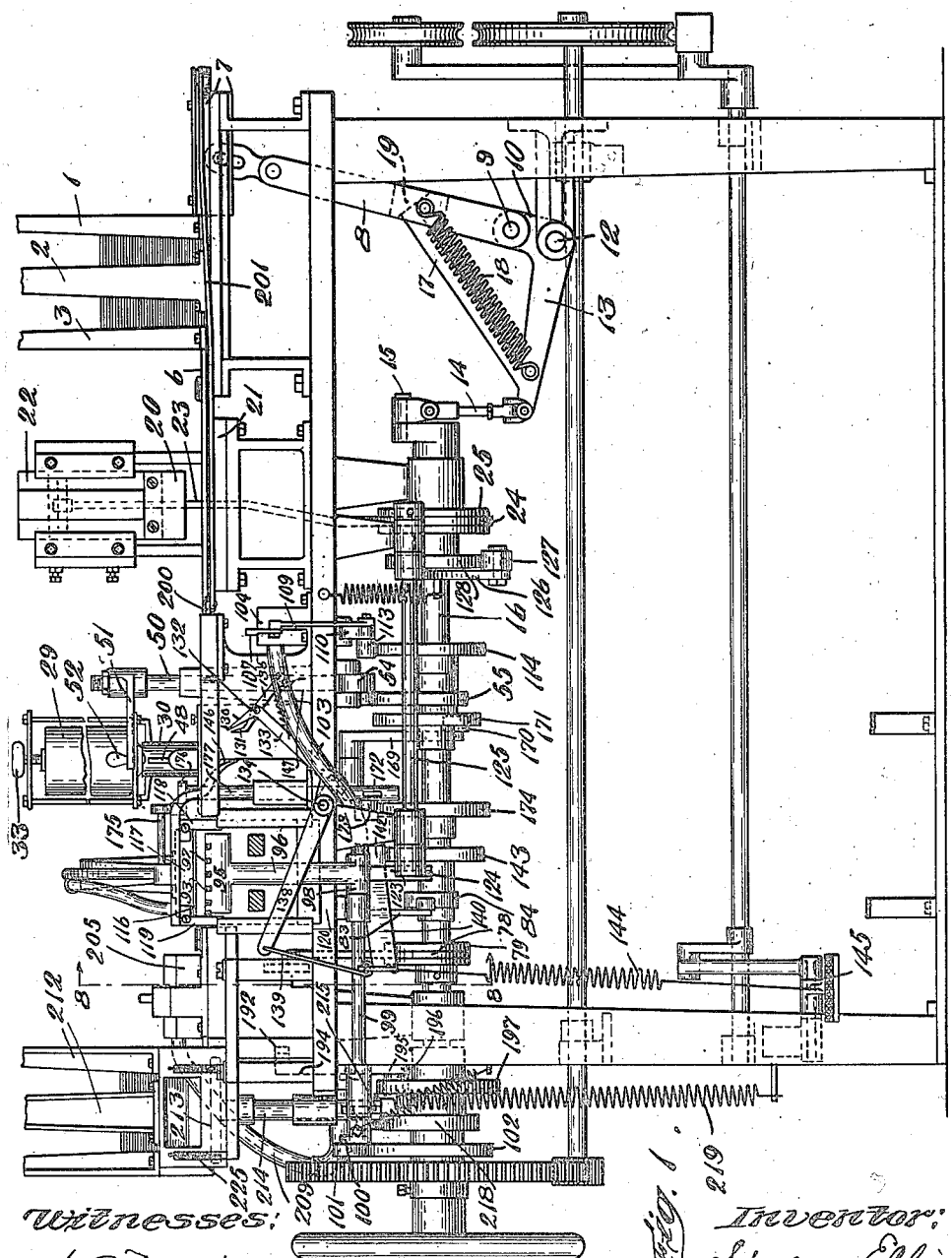
Figure 1, is a front elevation of a machine embodying this invention for making address-plates.

Figs. 4, 5, and 6 are detail views of the pasting-device.

Fig. 7, is an enlarged longitudinal vertical section of a means for holding the supporting-pieces while they are being pasted together with fragmentary portions of the pasting-device.

Fig. 8, is a vertical section of the machine taken on the dotted line 8, 8, Fig. 1, illustrating particularly the reversing holding-means for the supporting-pieces.

Figs. 9, 10, 11, and 12, are enlarged fragmentary details of the feeding and cutting-means for the stencil strip, by which the strip is fed forward and sections severed from it to form stencil-blanks.

Figs. 13 and 14 are, respectively, a bottom-plan and transverse section of the head of the penumatic carrier by which the stencil-blanks are picked up and carried to the pasted supporting-pieces and affixed thereto.

Fig. 15 is a detail of a valve employed to control the suction and pressure-pipe leading to the carrier.

Figs. 16 and 17 are detail views of a holder which is arranged adjacent to the holding-device to receive the supporting-pieces with stencil-blanks applied to them, and means to direct a blast of air toward the edges of the stencil-blank.

Fig. 18, is a detail view of the receptacle for the finished address-plates and means for arranging them in a pile or stack therein.

Fig. 19 is a full sized view of a reinforced supporting-piece, and,

Fig. 20 is a similar view of a completed address-plate.

The supporting-pieces 1$^a$ having edge-frames 1$^b$ to reinforce them, and herein referred to as reinforced supporting-pieces, are placed in a suitable holder arranged at one end of the machine, which holder is here shown as composed of a plurality of upright posts 1, 2 and 3, arranged with respect to each other to give to the holder a shape corresponding to the general contour of the reinforced supporting-pieces. At the bottom of the holder a pair of horizontally disposed supports 4, 4, are arranged at the sides thereof, upon which the pile of reinforced supporting-pieces rest, and said side supports are arranged with their top surfaces in alinement with grooves which are formed in guide-bars 5, 6, which guide-bars are arranged at the end of the holder, so that the bottom supporting-piece of the pile, when pushed forward, may enter the grooves in said guide-bars, and by said bars will be supported and guided while being moved along. 7 represents a suitable pusher which is arranged to slide horizontally, for the purpose of engaging one end of the lowermost supporting-piece and for pushing it from the bottom of the pile into engagement with the guide-bars 5, 6. Said pusher is loosely connected with an arm 8, arranged to swing in the arc of a circle and which is yieldingly supported, its movements in the arc of a circle operating to reciprocate the pusher and its yielding support enabling it to yield and prevent breakage in case a supporting-piece should become clogged in the holder or in the guideway which is arranged in continuation thereof. Said arm 8 is here shown as pivoted at 9, to the short arm 10, of a bell-crank lever, which is pivoted at 12, the long arm 13 of said lever being connected by a link 14, with a crank-arm 15, arranged on the main-shaft 16 of the machine being here shown as at the end of said shaft, and said arm 13, of the bell-crank lever has a rigid arm 17, extended from its extremity in a diagonal direction toward the arm 8, the end-portion of which arm 17 abuts against or is engaged by a stop 19, on said arm 8, and a spring 18 is arranged to draw said arm 8 toward and hold it in continuous engagement with said arm 17, yet permitting said arm 8 to yield in case of need. It will be understood that, so far as the construction here shown of this group of elements is concerned, other constructions may be employed in lieu thereof, which are arranged to reciprocate the pusher 7, but a construction is preferred which provides for yieldingly supporting the arm 8.

The reinforced supporting-pieces are successively pushed or fed forward into and along the guideway formed by the bars 5, 6, each supporting-piece acting as a means to advance the supporting-pieces in front of it, and when so moved they are successively brought into position to be engaged next by a cutting-device by which a large hole is cut in the center of the supporting-piece, here shown as of a shape corresponding to the general contour of the address-plate.

Said cutting-device will now be described.

Referring to Figs. 1 and 2, 20 represents a plunger which is arranged above a die-block 21, and the guide-bars 5, 6, extend over said die-block, so that the supporting-pieces will be brought into position over said die-block and beneath the plunger preparatory to being cut, and the supporting-pieces are permitted to repose for a short time on the die-block while the plunger descends, such moment of repose being incident to the intermittent operation of the feeding-device, heretofore described, but is long enough to enable the plunger to descend and cut a hole in the supporting-piece and return. Said plunger is supported by a head 22, arranged to slide vertically in suitable guideways provided for it on the frame, and a rod 23 is connected at its upper end to said head and extends downward and is connected to an eccentric-strap 24, arranged on an eccentric-disk 25, secured to the main-shaft 16, so that as said main-shaft rotates said head and plunger borne by it is reciprocated. In view of the fact that the construction of the cutting-device forms no particular part of my invention, it is not deemed necessary to describe it further in detail, but it will be understood that in lieu of the particular construction here shown other constructions may be employed which are arranged to cut a hole in the supporting-piece while the latter reposes on the die-block. Furthermore, in case the opening is formed in the supporting-piece before the same is placed in the receptacle 1, 2, 3, as is sometimes done, a cutting-device will not be required.

The reinforced supporting-piece having an opening formed therein is next advanced to a pasting-device by which paste is applied around the margin of the opening, to enable a stencil-blank to be adhesively secured thereto. A pasting-device such as may be employed for this purpose will now be described.

Referring to Figs. 3 to 7, 26 represents a paste-box which rests on a box-support 27, and is removable from its support, it being here shown as held in place by a turn-button 28. Said paste-box is arranged to be supplied with paste by means of a bottle or other receptacle 29, which is arranged in inverted position above an open-neck 30, which latter is in open communication with said box, so that the contents of the receptacle may flow into said box. The receptacle 29, rests upon a plate 31, provided with numerous projections arranged to enter the open-neck thereof, and said plate has on it a centrally disposed tube 32, which extends down into the open-neck for a short distance and terminates just below the top of the paste-box and the contents of said receptacle flows through said tube. The open-neck has small air vents at the top, and said tube has guide-ribs at the sides, to localize it with respect to the open-neck, thereby to provide for the passage of air to said vent, or to establish open communication between the paste-box and the atmosphere. Said receptacle is held in place by a clamping-screw 33, arranged on a frame which is extended about the receptacle, and said screw when loosened admits of the receptacle being removed. By this construction the paste is automatically supplied to the paste-box and a predetermined level maintained therein, which level is here shown as at the top of the box, but it may be at any other desired place. Said paste-box has an opening 34 at the top over which the supporting-pieces repose while the paste is deposited thereon, said opening permitting of the passage through it of the pasting-form. For the purpose of holding the supporting-pieces in position above said opening while the paste is being applied, supporting-means are here shown, which are attached to the box-support, thereby admitting of the removal of the paste-box independently thereof. Said supporting-means comprise a pair of grooved guide-bars $5^a$, $6^a$, made like the guide-bars 5, 6, and arranged in continuation thereof, and said guide-bars $5^a$, $6^a$, are disposed at opposite sides of the opening 34, and referring particularly to Fig. 7, a plate 35 is arranged above the opening, which is attached at one side to the box-support, as by screws 36, and the guide-bar $6^a$ is arranged beneath said plate and is attached thereto by screws 37; and a frame is arranged at the other side of said plate comprising strips 38, arranged to be extended over the plate and for attachment thereto, and a strip 39, arranged at right-angles to said strips 38, to which said strips 38 are attached, and the guide-bar $5^a$ is attached to said frame. Said supporting-means for the guide-bars $5^a$, $6^a$, when thus constructed, may be detached from the box-support as a unit or in fragments as desired. Said plate has arranged on its underside a flat-faced rib 40, of rectangular or other shape, corresponding to the shape of the line of paste which is to be applied to the supporting-piece, and said rib terminates substantially flush with the plane of the supporting-piece, so as to act to hold said supporting-piece against deflection by engaging its upper side when the pasting-form is lifted and moved into engagement with its underside to apply paste thereto.

The supporting-pieces are moved along the guide-way into a position above said opening, and are held by the guide-bars $5^a$, $6^a$, and said supporting-pieces are allowed to repose in such position for a short period of time incident to the intermittent operation of the feeding-means, which period of time is long enough for the pasting form to apply paste thereto.

The pasting form, by which paste is applied to the supporting-pieces, is submerged in the paste in the paste-box at a point directly beneath the opening 34, and is adapted to be moved up and down in a vertical direction, and when raised to project into or through said opening, to engage the supporting-pieces, and while in engaging position to press the supporting-pieces against the rib 40. As here shown, said pasting form is made as an open frame, shaped to correspond with the shape of the opening in the supporting-piece, and its dimensions are a little larger than said opening, thereby to apply a line of paste around the margin thereof. The top of said open frame is formed with an engaging-portion 41 to engage the underface of the supporting-pieces, and said engaging-portion is here shown as continuous and made quite narrow and having numerous small laterally extended projections 42 at each side of it, which projections may be formed by cutting a plurality of vertical grooves in both the inside and outside of the frame, and the engaging-face of said portion 41, and the engaging-faces of the projections are made flat, and arranged to occupy a horizontal plane. This form of engaging-portion results in applying a continuous line of paste around the margin of the opening in the supporting-piece, the edges of which are scalloped as shown at 42$^a$ Fig. 19. A line of paste of such configuration covers a large area and affords a very secure means of adhesively securing a stencil-blank to a supporting-piece, yet it is obvious that the engaging-portion may be varied in shape without departing from the spirit of the invention. Said paste-applying member or frame is secured to, or is arranged upon a crosshead 43, arranged to slide in vertical guideways 44, arranged on the inside wall of the paste-box, and said crosshead has a pin 45, or other means adapting it for engagement with one end of a lever 46, pivoted at 47, the other end of said lever being pivotally connected with the lower end of a vertically movable rod 48, which extends up through a hole in the top of the paste-box. The weight of the pasting form is sufficient to normally hold it in its lowermost position and to return it, when lifted, consequently the rod 48 is arranged to be moved downward for the purpose of lifting said form. As a means to thus move said rod 48 in a downward direction, a vertically sliding bar 50, is supported at one side of the paste-box, having a short arm 51 rotatably arranged upon its upper end-portion, and extended laterally from it, which arm may be swung in a horizontal plane into and out of position to engage the upper end of said rod 48, and said arm 51, is arranged for vertical adjustment on said bar 50, and also has a handle 52, by which it may be swung. The bar 50 extends down through the bed-plate of the machine and is slotted at 53, and into the slot the end-portion of a pivoted lever 54 extends, and said lever, with or without the roll thereon, is arranged in engagement with a disk-cam 55 secured to the main-shaft 16. Said cam is employed to lift the lever 54, and thereby lift the bar 50 to permit downward movement of the pasting form, and a spring 56 is connected to the lower end of said bar 50, which acts to draw said bar in a downward direction and thereby lift the pasting form with a yielding pressure against the supporting-piece, and also acts to hold the lever 54 in continuous engagement with the cam. By means of this particular structure, it will be observed that the pasting-form is moved into engagement with the supporting-pieces by a yielding pressure, which is quite important, but the structure itself by which this result is accomplished may be varied materially from that here shown and the same results accomplished.

The reinforced supporting-piece having paste applied to its underside, around the margin of its opening, see Fig. 19, is next advanced to means employed for applying a stencil-blank to its pasted side. Said means involves reversing holding-means for the supporting-piece which receives a supporting-piece from the pasting-device, and while holding it, reverses its position, so as to bring its pasted side uppermost, preparatory to the stencil-blank being applied to it. Such reversing holding-means will now be described.

60 represents a shaft supported by the frame, and upon said shaft, is loosely mounted a sleeve 61, bearing one or more pairs of radially extended arms 62, 63, two pairs being here shown, which are arranged upon opposite sides of and extended in opposite directions from the sleeve. The arms of each pair are arranged in parallel relation and together with the space between them are coextensive with the length of a reinforced supporting-piece. Each arm has an elongated recess 64, in one side of it at a point intermediate its length, and the recess 64 in the arms of each pair are arranged in alinement, and at the inner end of each recess a slot or groove 65 is formed to receive one edge of the reinforced supporting piece, said groove being produced by forming a shoulder in the arm and arranging a plate over the shouldered portion; and the outer ends of the arms of each pair are connected together by a bar 66, having a groove formed lengthwise therein on that side of it adjacent the recesses, which groove, it will be observed, is located at the outer ends of the recesses and opposite the grooves 65, and is adapted to receive the other edge of the supporting-piece. The length of the recesses 64, plus the depth of the grooves communicating therewith is substantially the same as the width of the supporting-pieces, so that the supporting-pieces may repose in said grooves and be thereby held by the arms. A flat plate 67 is arranged over the space between the arms 62, 63, which is attached to said arms at one side only, and which serves as a yielding back-plate against which the supporting-piece will be pressed while reposing in the grooves and the stencil-blank is being applied to it. The shaft 60, is arranged with relation to the pasting-means, heretofore described, and to the means for applying the stencil-blank hereinafter described, so that the arms of one holding-device may occupy a horizontal position, in alinement with the guideways which are arranged in or extended through the pasting-device, and during such time the arms of the other holding-device may occupy a position in correlation with the stencil-blank applying-means. When so disposed the reinforced supporting-pieces may be moved along in a horizontal plane from the pasting-device into engagement with the arms of that holding-device which at the time is alined therewith. The supporting-piece is at such time arranged with its pasted side facing downward. By giving the sleeve 61 a half turn the holding-devices carried by it will be correspondingly moved, and the supporting-piece, which is fed to one of said devices from the pasting-device, will be moved into position for coöperation with the means employed for applying to it a stencil-blank, and also will be reversed, so that its pasted side is uppermost. As the sleeve bears two pairs of arms which are extended radially from it in opposite directions thereby providing two holding-devices, it will be observed that while one holding-device occupies a position in alinement with the guideways of the pasting-device, the other occupies a position in coöperative relation with the means for applying the stencil-blank. The sleeve bearing said holding-devices is designed to be repeatedly given a half turn in the same direction, and to thus rotate said sleeve intermittently, actuating-means are provided which are here shown as connected with the main-shaft 16.

The actuating-means here shown consists of a disk 70, secured to the sleeve, having two notches 71, in its edge, which are arranged opposite each other, and a pawl 72, pivotally supported on a pawl-carrying arm 73, and arranged for engagement with said notches, said arm being mounted for oscillation on the shaft 60; and a pinion 74, is secured to the hub of said arm 73, which is engaged by a toothed-sector 75, pivoted at 76, to the frame and having a short arm 77, extended from it which is connected by a link 78, with an eccentric 79, arranged on the main-shaft 16. During each rotation of the main-shaft said eccentric is rotated and the sector oscillated to correspondingly oscillate the pinion and the pawl-carrying arm connected with it, thereby to cause the pawl which engages one of the teeth of the disk 70 to move said disk one-half a revolution, and then to return for engagement with the other notch in said disk preparatory to repeating the operation.

It is very desirable to securely hold said holding-means in a predetermined position with respect to the pasting-device and the stencil-blank applying-means, while a supporting-piece is being moved from the pasting-device to said holding-means, and while a supporting-piece is being presented to the stencil-blank applying-means, and to accomplish this result a locking-lever 80, is here provided, which is pivoted at 81, and has its engaging end-portion 82 arranged to engage the bar 66, of the holding-means, and has its lower end-portion extended, as at 83, for engagement with a cam 84, which is secured to the main-shaft 16. Said lever is held in locking-position with its end-portion 83 in engagement with the cam by a spring 85. During each rotation of the main-shaft said cam 84 is rotated and during a short interval of time the locking-lever is moved to disengage the holding-means, permitting rotation thereof, and during the remainder of the time said locking-lever is in engaging position, acting to hold the holding-device.

The stencil-blanks 90ª consist of small thin pieces of paper, such for instance, as mimeograph paper, and they are cut from a strip, and, as here shown, a table 90 is arranged at the front of the machine upon which a pile of such strips may rest, and it is one of the functions of the operator to take a strip from the pile and place it in the feeding and cutting-means, herein provided, by which the strip is fed forward and stencil-blanks cut from it. Said feeding and cutting-means will now be described, reference being had particularly to Figs. 8 to 12. 91 represents another table, usually arranged at the side of the table 90, upon which a single strip 91ª is laid, and said strip is pushed forward by hand over a pneumatic feeding-device, and beneath a set of fingers and against the cutting-blades or some other means for limiting its forward movement. It is then fed forward intermittently by the action of the pneumatic feeding device. The table 91 is arranged with a forward extension comprising a set of fingers 92, which are rigidly connected to the table, and arranged horizontally over which the strip is fed and upon which the strip rests; and a set of fingers 93, which may be resilient, are arranged above the fingers 92, which serve to prevent the strip from curling at the edges and to serve as a guide. 95 represents a pneumatic strip-engaging device, here shown in Fig. 9 as a hollow cylindrical shell with closed ends, having small slits or perforations arranged along its upper side, and having a large opening in its underside intermediate its length, into which is fitted a pipe 96. The upper side of said shell has recesses 97, arranged to receive the fingers 92, and the slits or perforations are arranged in those portions of the shell between said recesses, which portions project between the fingers and terminate substantially flush with the upper surface thereof, thereby to engage the strip. The pipe 96, has at its lower end a hollow hub 98, which is secured to one end of a rock-shaft 99. Said shaft is rocked, thereby to move the perforated shell back and forth by means of an arm 100, which is secured to the shaft and which has a laterally extended pin 101, at its extremity, with or without a roll thereon, which engages a cam-disk 102, secured to the main-shaft 16. During each rotation of said main shaft the shaft 99 is rocked and the pneumatic-device moved to feed forward the strip and to return. The hollow hub 98 is connected by a flexible hose 103, with a valve-case 104, see Figs. 1 and 12, and a flexible hose 105 leads from said valve-case to a main suction-pipe 106, which is connected with any suitable exhausting device not shown. The valve which is arranged in said valve-case 104, is here shown as a plate 107, pivoted at 108, and arranged to extend into said case, and having a hole through it for the control of the ports in the case, which, when in register therewith, provide an open communication through the valve-case, and when out of register therewith close such communication. Said valve-plate 107 is arranged to be moved automatically, so as to control the exhaust at predetermined times, and, as here shown, said plate is connected by a link 109, with a lever 110, pivoted at 112, and bearing a laterally extended pin 113, with or without a roll thereon, arranged to engage a cam-disk 114, which is secured to the main-shaft 16. Upon each rotation of the main-shaft the valve-plate is moved so that the exhaust will be opened for a short period of time, during which time the pneumatic-device moves forward to feed the strip, and will be closed for a short period of time, during which time said pneumatic-device returns.

The cutting-means, as here shown, comprises a pair of cutting-blades 115, 116, the blade 115, being stationarily supported on the frame, and the blade 116 being arranged on a vertically movable frame-structure, which as here shown, comprises a horizontally arranged bar 117, a pair of upright side-bars 118, 119, and a horizontally arranged bar 120, secured to the lower end of said upright side-bars 118, 119, see Fig. 8; and said frame-structure is arranged to slide in vertical guide-ways provided for it in the upright portions 121, 122, on the frame. For the purpose of moving the blade 116, a link 123 is connected at its upper end to the lower horizontal-bar 120, and at its lower end to the extremity of an arm 124, pivoted at 125, and an arm 126 is connected to its pivot-stud having a laterally extended pin 127, at its extremity, with or without a roll thereon, which engages a cam-disk 128, which is secured to the main-shaft 16. Upon each rotation of the main-shaft said movable blade 116, is caused to descend and coöperate with the blade 115, and cut a section from the strip, which section, it will be understood constitutes a stencil-blank.

When the stencil-blanks are cut from the strip there is sometimes a short section left, say an eighth of an inch long or thereabout, and means are herein provided for engaging such short remaining-portion of the strip, and removing it from the machine. Said means, as here shown, consist essentially of a pair of nippers, see detail Fig. 9, arranged at the side, just in rear of the cutting-blades and at one end thereof, said nippers acting to engage the edge of the strip. 130, 131, represent the two nipper-members, pivoted together at 132. The member 130 is arranged on an arm 133 pivoted at 134, enabling it to swing in the arc of a circle, and the member 131, is arranged on an arm 135, bearing a laterally extended pin 136, with or without a roll thereon, and said arm 135 is connected by a spring 137, with the arm 133, so that when permitted, said spring acts to close the nippers. Said nippers are movable into position to engage the edge of the strip, and out of position to eject the portion which is removed by it. As a means for thus moving the nippers, an arm 138 is mounted on the pivot-stud 134, having a short end-portion arranged for adjustable connection with the arm 133, and its other end-portion is connected by a link 139, with the extremity of a bent lever 140, pivoted for convenience on the pivot rod 168, shown in Fig. 8, and having a laterally extended pin 142, with or without a roll thereon, arranged for engagement with a cam-disk 143, on the main-shaft 16, and said arm is held in engagement with its cam-disk by a spring 144, herein shown as connected with a treadle 145, but it may be otherwise supported. During each rotation of the main-shaft the nippers are moved forward to engage the strip and are returned.

As the nippers are moved forward to engage the strip, the pin or roll on the arm 135, is moved into the path of a cam 146, which is made as a bent arm, and is secured to the frame-structure which bears the movable cutting-blade, so that when said cutting-blade is moved into its elevated position, said cam will engage and move the arm 135, thereby to close the nippers. As the nippers are moved rearward said pin or roll engages a cam 147 on the frame, thereby to open the nippers and permit the piece held by it to escape. The escape of the piece may be expedited by means of a blast of air from a nozzle 148, which is connected with a flexible hose 149, which hose is connected with a pipe 150, containing air under pressure, which pipe is connected with an air-pressure device of any suitable form, not shown. In order to prevent the edge-portion of the strip from being engaged by the nippers, yet insure the edge-portion of the short section being engaged, a lifting-finger 155, is arranged on the table 91, at the end of the set of stationary fingers 92, and in parallel relation therewith, and said lifting-finger is so disposed that the edge of the stencil-strip passes over it, thereby lifting said edge. The end-portions of the nippers are arranged in front of said lifting-finger, and between it and the cutting-blades, but in a plane below the top of said finger, so that the edge-portion of the stencil-strip is normally held in a plane above the nippers, so as not to be engaged by them, but when the stencil-strip has been reduced in length to such an extent that but a short portion remains, which is of less length than the distance between the end of the lifting-finger and the cutting-blades, such short portion will fall in front of said lifting-finger, and will occupy a plane to be engaged by the nippers. Thus it will be seen that only the short lengths of the stencil-strips will be engaged by the nippers, although said nippers may be operating continuously during the running of the machine.

The stencil-blanks which are severed by the cutting-blades repose on a set of fingers 160, arranged in front of said blades, see Fig. 8, and are then picked up by a carrier, and carried to and placed upon the pasted side of the supporting-piece, which is at such time held by one of the holding-devices. The carrier here shown, is arranged for pneumatic operation to pick up the stencil-blanks and for mechanical operation to carry the stencil-blanks so picked up to the holding-device. 161 represents a box-like structure, see Figs. 8, 13, and 14, of rectangular form, and closed except for perforations in its bottom-plate, and an opening in its top plate, into which a flexible pipe 163 is fitted. The perforated bottom-plate is best shown in Fig. 13, and the perforations are arranged substantially coextensive with the contour or margin of the stencil-blank, and also to extend lengthwise said blank, intermediate its width, thus enabling the stencil-blank to be engaged at numerous closely disposed points. Said box-like structure or head, as it may be termed, is arranged at the extremity of a bent arm 165, pivoted at 166, to the upper end of an arm 167, pivoted at 168. A short arm 169, is secured to the pivot-shaft 168, having a laterally extended pin 170, with or without a roll thereon, arranged for engagement with a cam-disk 171, secured to the main-shaft 16, and another arm 172, is secured to said pivot-shaft 168, having a laterally extended pin 173, with or without a roll thereon, arranged for engagement with a cam-disk 174, also secured to the main-shaft 16. The cam-disk 171, is arranged to move the bent arm 165, in a direction toward the right, Fig. 8, and the cam-disk 174, is arranged to move said bent arm in a direction toward the left, thereby insuring a positive movement of the carrier in both directions to go and pick up a stencil-blank and to return and place it on a pasted supporting-piece. In addition to these to and fro movements of the carrier, said carrier is given other movements, whereby its head is moved in a vertical direction at both ends of its stroke, thereby to engage a stencil-blank by a vertical movement and to disengage the stencil-blank also by a vertical movement, and, as here shown, the arm 165 has a laterally extended pin 175, with or without a roll thereon, arranged for engagement with a cam-plate 176, which plate is arranged on an upright post 177, slidably arranged in a bearing in the frame, and said post is arranged for vertical movement by means of an arm 172, the end-portion of which is extended through a slot in the lower end-portion of the post, thus the cam 176 is moved vertically, thereby to correspondingly move the arm 165. Said arm 165, is also moved by the cam-plate as the pin or roll 175, passes over it during the to and fro movements of the arm, and said cam-plate serves to support the arm 165, at all times when said arm is not otherwise supported. The lower end of the head 161 of the carrier bears a laterally extended pin 179, which is arranged to engage the cam 180, on the side of the holding-device, and will engage said cam when the holding-device is in position to hold the supporting-pieces to receive the stencil-blanks.

Assuming the carrier to be in the position shown in Fig. 8, wherein its head is in position to apply a stencil-blank to the supporting-piece, the pin 179 is in engagement with the cam 180, and the cam-plate 176 is in its elevated position. As the carrier moves toward the right its head is partially lifted by the pin 179, passing over the cam 180, and when arriving at the end of said cam the pin or roll 175, engages the cam-plate 176, whereupon the position of the carrier is then controlled by said cam-plate 176, until it arrives at a point above the fingers 160, and then upon downward movement of said cam-plate 176, it descends in a vertical direction for engagement with the stencil-blank; and on return movement of the carrier its head is moved in a vertical direction by the pin or roll 175, passing over the rise in the cam-plate 176, and is then moved in a vertical direction by said cam-plate incident to a rising movement of the post 177, and as it arrives at the end of its return movement the next holding-device is at such time brought into position for its cam 180, to engage the pin 179, on the head of the carrier, and thereby correctly dispose said head with respect to the pasted supporting-piece which is held by the carrier.

As it is designed that the stencil-blank shall be picked up by suction and shall be disengaged by air pressure, the flexible pipe 163, leading to the head 161, is connected to a valve-casing 185, containing a slide-valve 186, of any suitable construction, which is arranged to control two inlet ports and one outlet port, the latter being in open communication with said pipe 163, and the former being in open communication, respectively, with a pipe 190, leading to the suction-pipe 106, and a pipe 191, leading to the pressure-pipe 150. Said slide-valve is reciprocated automatically by means which is in timed relation with the movements of the carrier, and, as here shown, said slide-valve is connected by a link 192, which is loosely connected to the extremity of an arm 193, secured to a pivot-shaft 194, and an arm 195, is secured to said pivot-shaft having a pin 196, with or without a roll thereon, which is arranged for engagement with a cam-disk 197, secured to the main-shaft 16, and said arm is held in continuous engagement with said cam-disk by a spring 198. Thus the cam-disk moves the slide-valve in one direction against the action of said spring 198, and said spring returns it. The cam-disk 197, is here shown as shaped to control the position of the slide-valve with relation to the ports in the valve-case in such manner as to cause said slide-valve to occupy three different positions, thereby to open a way for suction and to open a way for pressure, and to close the ways at an intermediate point.

The stencil-blank having been applied to a pasted supporting piece which is held by the holding-device, said supporting-piece is then moved along the supporting and guiding-means of said holding-device and is discharged therefrom, and, as a feeding-means to thus move said piece along a pusher, here shown as a plate 200, is arranged horizontally in a guide-way provided for it, said plate being connected by a link 201, with the pusher 7, so that both pushers are operated simultaneously.

The supporting-piece having a stencil-blank applied to it, when discharged from the holding device, is or may be moved into engagement with another holder, see Figs. 16 and 17, comprising a pair of grooved guide-bars 202, 202, arranged in alinement with the guide-bars of the holding-device, said guide-bars being arranged at opposite sides of a platen 203, and suitably supported, and means are or may be provided for delivering upon the supporting-piece so held a strong blast of air, which is directed toward the edges of the stencil-blank, the tendency of which is to lay down said edges in case they should have a tendency to curl. Such tendency, however, is not usual and hence this device may be omitted. In its construction said device comprises a box-like structure 205, supported by a frame above said platen, and has perforations or slits arranged around its bottom-plate, thereby to direct a blast of air in a downward direction. Said box-like structure is arranged in open communication with a passage 206, see dotted lines Fig. 16, formed in a support for the same, and having an opening at the side or elsewhere, and a rotary valve-plate 207 is arranged for communication with said frame by which to control the flow of air through said passage, said valve-plate having, as here shown, two holes through it, either of which when in register with the opening to said passage, opens said passage, and at other times said passage is closed. Said valve-plate is arranged in a casing 208, to which a flexible pipe 209 is connected, which pipe is connected with the air pressure pipe 150. Said valve-plate is or may be secured to the shaft 60, bearing the holding-device, and rotated by said shaft.

The supporting-piece with a stencil-blank secured to it is then moved along to a position beneath an opening arranged in a plate 210, which forms the base-plate of a receptacle to contain a pile or stack of supporting-pieces, which when thus finished serve as and constitute address-plates. Said receptacle is formed essentially by a plurality of uprights 212, arranged on the base, in relation to each other so as to form a space between them of a shape corresponding to the shape of the address-plate. In the base 210, and at the bottom thereof, a lifting-plate 213, is arranged over which the address-plates are thrust by the feeding-means, which, it will be understood, is the feeding-means heretofore employed for pushing the supporting-piece along from the holding-device to the aforesaid holder, and in Fig. 18, an address-plate is represented as resting on said lifting-plate 213. Said lifting-plate is arranged upon the upper end of a post 214, which slides vertically in bearings provided for it, and as a means to move said post in an upward direction, an arm 215 is pivoted at 216, and its end-portion extends through a slot in the lower end-portion of the post 214, and said arm has a laterally extended pin 217, with or without a roll thereon, which engages a cam-disk 218, secured to the main-shaft 16. A spring 219 is connected to said post by which it is drawn down, and the arm 215 is held in continuous engagement with the cam-disk 218. As the lifting-member is raised the address-plate is moved upward and passes a plurality of pawls 220, pivoted at 221, to the base 210, the upper end-portions of said pawls projecting into the space or hollow of said base, and said pawls serve to hold the pile or stack of address-plates which may be accumulated thereon, one by one, by repeated movements of the lifting-member. The upward movement of said lifting-member is sufficient to carry the address-plate held by it to a plane above the engaging end-portions of said pawls, so that as said plate returns the pawls will engage the plate on said member and will remove it therefrom. To enable said pawls to engage the address-plate which rests upon the lifting-member, the sides of said member are recessed at 223, so that the address-plate will extend over the tops of said recesses, and said recesses are arranged with respect to the pawls so that the pawls will enter them and engage the address-plate. Said pawls are held in their normal plate-holding position by springs 225.

I claim:—

1. In a machine for applying stencil-blanks to supporting-pieces, the combination of a holder for the supporting-pieces having supporting and guiding means, intermittent feeding-means for the supporting-pieces, a pasting-device having supporting and guiding-means for the supporting pieces in continuation of the aforesaid supporting and guiding-means along which said supporting-pieces are moved by said feeding-means, said pasting-device being adapted to deposit paste on the supporting-pieces preparatory to applying the stencil-blanks thereto, means to operate said pasting-device, and manual means arranged to connect the pasting-device with and disconnect it from its operating-means, substantially as described.

2. In a machine for applying stencil-blanks to supporting-pieces having openings, the combination of a holder for the supporting-pieces, intermittent feeding-means for the supporting-pieces, a pasting-form consisting of an open frame of larger dimensions than the opening in the supporting-pieces, supporting and guiding-means for the supporting-pieces arranged above said form, said supporting-pieces being movable intermittently by the aforesaid feeding-means along said supporting and guiding-means, and then held at rest and correctly disposed relative to the pasting-form while said pasting-form operates to deposit a line of paste around the margins of the openings, substantially as described.

3. In a machine for applying stencil-blanks to supporting-pieces, the combination of means for applying the stencil-blank, a pasting-device, supporting and guiding-means for the supporting-pieces associated therewith, a pair of reversing holding-devices for the pasted supporting-pieces, arranged for rotation adjacent the pasting-device and the means for applying the stencil-blank, first one and then the other holding-device being arranged in alinement with the supporting and guiding-means to receive the supporting-pieces from the pasting-device, and upon rotation reversing said supporting-pieces and holding them in position for the stencil-blank to be applied thereto, substantially as described.

4. In a machine for applying stencil-blanks to supporting-pieces, the combination of a pasting-device, supporting and guiding-means for the supporting-pieces associated therewith, intermittent feeding-means for said supporting-pieces, stencil-blank applying-means, and a pair of holding-devices arranged between said pasting-device and stencil-blank applying-means, so arranged that one holding-device is in position to receive a pasted supporting-piece from the pasting-device, while the other holding-device is holding its supporting-piece in position to have a stencil-blank applied to it, and means to move said holding-devices to reverse their positions with respect to the pasting-device and the stencil-blank applying-means, substantially as described.

5. In a machine for applying stencil-blanks to supporting-pieces, the combination of a pasting-device, supporting and guiding-means for the supporting-pieces associated therewith, intermittent feeding-means for said supporting-pieces, stencil-blank applying-means, and a pair of holding-devices arranged between said pasting-device and stencil-blank applying-means, so arranged that one holding-device is in position to receive a pasted supporting-piece from the pasting-device, while the other holding-device is holding its supporting-piece in position to have a stencil-blank applied to it, and means to move said holding-devices to reverse them and also reverse their positions with respect to the pasting-device and stencil-blank applying-means, substantially as described.

6. In a machine for applying stencil-blanks to supporting-pieces, the combination of means for applying the stencil-blank, a pasting-device, supporting and guiding-means for the supporting-pieces associated therewith, a pair of reversing holding-devices for the pasted supporting-pieces, arranged for rotation adjacent the pasting-device and the means for applying the stencil-blank, and means to intermittently rotate said holding-devices, thereby reversing the supporting-pieces, and presenting them to the stencil-blank applying-means, substantially as described.

7. In a machine for applying stencil-blanks to supporting-pieces, the combination of means for applying the stencil-blank, a pasting-device, supporting and guiding-means for the supporting-pieces associated therewith, a pair of reversing holding-devices for the pasted supporting-pieces, arranged for rotation adjacent the pasting-device and the means for applying the stencil-blank, and means to intermittently rotate said holding-devices, thereby reversing the supporting-pieces, and presenting them to the stencil-blank applying-means, and means to lock said reversing holding-devices in their normal positions of repose, substantially as described.

8. In a machine for applying stencil-blanks to supporting-pieces, the combination of means for applying the stencil-blanks, a pasting-device, supporting and guiding-means for the supporting-pieces associated therewith, intermittent feeding-means for the supporting-pieces, and a reversing holding-device for the pasted supporting-pieces, arranged to receive said pieces from the pasting-device, and present them to the stencil-blank applying-means, and means to operate said reversing holding-device in timed relation with the intermittent feeding-means, substantially as described.

9. In a machine for applying stencil-blanks to supporting-pieces, the combination of a pasting-device, supporting and guiding-means for the supporting-pieces associated therewith, intermittent feeding-means for the supporting-pieces, a reversing holding-device for the pasted supporting-pieces consisting of a pair of arms radially disposed on a shaft, and means borne by said arms to support and guide the edges of the supporting-pieces, and means to rotate said shaft intermittently, thereby to reverse the position of the holding-device and the supporting-pieces carried by it, substantially as described.

10. In a machine for applying stencil-blanks to supporting-pieces, the combination of a pasting-device having supporting and guiding-means for the supporting-pieces, a movable holding-device for the pasted supporting-pieces having means arranged in continuation of the supporting and guiding-means of the pasting-device, and arranged to hold the supporting-piece with its pasted portions exposed, intermittent feeding-means for the supporting-pieces arranged to feed them along the supporting and guiding-means of the pasting-device and holding-device, a carrier for the stencil-blanks, and means to move the carrier to carry the stencil-blanks to and place them on the supporting-pieces, substantially as described.

11. In a machine for applying stencil-blanks to supporting-pieces, the combination of a pasting-device arranged to deposit paste on the under side of the supporting-pieces, a reversible holding-device arranged in front of said pasting-device to receive said pieces therefrom, intermittent feeding-means to feed the supporting-pieces from the pasting-device to the holding-device, means to reverse the position of the holding-device after a pasted supporting piece has been received by it, thereby to bring its pasted sides uppermost, a carrier for the stencil-blanks, and means to move the carrier to carry the stencil-blanks to and place them on the pasted supporting-pieces, substantially as described.

12. In a machine for applying stencil-blanks to supporting-pieces, the combination of a holding-device arranged to hold the pasted supporting-pieces with their pasted portions exposed, a pneumatic-device operating by suction to pick up a stencil-blank and carry it to the pasted supporting-pieces, and operating by air pressure to disengage the blank and force it against the pasted portions thereof, an exhaust and an air-pressure device with which said exhaust is connected, a valve arranged to control the exhaust and air pressure, and means to operate said valve in timed relation with the movements of the carrier, substantially as described.

13. In a machine for applying stencil-blanks to supporting pieces, the combination of a holding device for a pasted supporting piece, of a pneumatic feeding device operating by suction to engage a stencil-strip at a place remote from its end to leave a section at the end of suitable length for a stencil-blank, said device being movable to feed forward the strip to the cutting device a distance sufficient to carry its end section beyond the cutters, a pneumatic carrier arranged to engage the end section of the strip and carry it, when severed, to the pasted supporting pieces, and a cutting device arranged to sever the strip between the carrier and strip feeding device while the strip is being held by them.

14. In a machine for applying stencil-blanks to supporting pieces, the combination with a holding device for a pasted supporting piece, of a pneumatic feeding device operating by suction to engage a stencil strip at a place remote from its end to leave an end section of suitable length for a stencil-blank, a cutting device for the strip, said feeding device being arranged to feed forward the strip to the cutting device a sufficient distance to carry its end section beyond the cutters, and means to engage the end section of the strip operating by suction to hold it while the cutters operate to sever the strip, said means being movable to carry the severed end section to the supporting piece to which it is to be applied.

15. In a machine for applying stencil-blanks to supporting-pieces, the combination with a holding-device for a pasted supporting-piece, of feeding and cutting-means to feed forward a stencil-strip, and sever sections therefrom, a carrier arranged to carry the severed sections to and place them on the pasted supporting-pieces, and means arranged to engage the short end-portion of a strip and remove it from the machine, substantially as described.

16. In a machine for applying stencil-blanks to supporting-pieces, the combination of a holding-device for a pasted supporting-piece, a carrier arranged to carry the stencil-blanks to and affix them on the supporting-pieces on said holding device, a holder for the supporting-pieces having a stencil-blanks applied to them, and means arranged adjacent said holder to deliver a blast of air to the supporting-pieces with stencil-blanks applied to them, said blast of air being directed toward the edges of the stencil-blanks, substantially as described.

17. In a machine for applying stencil-blanks to supporting-pieces, the combination of a holding-device for a pasted supporting-piece, a carrier to carry the stencil-blanks to and affix them on the supporting-pieces on said holding device, a holder for the supporting-pieces having stencil-blanks applied to them, said holder being arranged in alinement with the holding-device, feeding-means for feeding the supporting-pieces with stencil-blanks applied thereto from the holding-device to said holder, and means arranged adjacent said holder to direct a blast of air toward the edges of the stencil-blank, which is affixed to the supporting-pieces, substantially as described.

In testimony whereof, I have signed my name to this specification, in the presence of two subscribing witnesses.

STERLING ELLIOTT.

Witnesses:
B. J. NOYES,
H. B. DAVIS.